United States Patent
Ma et al.

(10) Patent No.: US 10,204,655 B1
(45) Date of Patent: Feb. 12, 2019

(54) HEAT-ASSISTED MAGNETIC RECORDING DEVICE CAPABLE OF PREVENTING CONTAMINANT ON THE HEAD

(71) Applicant: Seagate Technology LLC, Cupertino, CA (US)

(72) Inventors: Minjie Ma, Sunnyvale, CA (US); Tim Rausch, Farmington, MN (US); Edward Charles Gage, Lakeville, MN (US); James Dillon Kiely, Edina, MN (US); Paul M. Jones, Palo Alto, CA (US); Yang Yang, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/784,509

(22) Filed: Oct. 16, 2017

Related U.S. Application Data

(60) Provisional application No. 62/417,050, filed on Nov. 3, 2016.

(51) Int. Cl.
  *G11B 11/00* (2006.01)
  *G11B 21/10* (2006.01)
  *G11B 5/00* (2006.01)
  *G11B 7/126* (2012.01)
  *G11B 7/1267* (2012.01)
  *G11B 7/1263* (2012.01)
  *G11B 5/60* (2006.01)

(52) U.S. Cl.
  CPC .......... *G11B 21/106* (2013.01); *G11B 5/6088* (2013.01); *G11B 7/126* (2013.01); *G11B 7/1263* (2013.01); *G11B 7/1267* (2013.01); *G11B 2005/0021* (2013.01)

(58) Field of Classification Search
  None
  See application file for complete search history.

(56) References Cited

U.S. PATENT DOCUMENTS

| | | | | |
|---|---|---|---|---|
| 5,396,480 A | * | 3/1995 | Morishita | G11B 7/00454 369/100 |
| 8,873,350 B2 | * | 10/2014 | Rausch | B65D 75/563 369/13.33 |
| 8,995,080 B1 | | 3/2015 | Mou et al. | |
| 9,042,047 B1 | | 5/2015 | Dube | |
| 9,236,081 B1 | * | 1/2016 | Chu | G11B 11/10595 369/13.26 |
| 9,916,851 B1 | * | 3/2018 | Seigler | G11B 7/1267 369/13.26 |
| 2006/0099461 A1 | | 5/2006 | Jones et al. | |
| 2006/0105203 A1 | | 5/2006 | Li et al. | |
| 2014/0119164 A1 | * | 5/2014 | Wilson | G11B 5/314 369/13.26 |
| 2014/0334274 A1 | * | 11/2014 | Dakroub | G11B 5/314 369/13.26 |

(Continued)

*Primary Examiner* — Tan X Dinh
(74) *Attorney, Agent, or Firm* — Hollingsworth Davis, LLC

(57) ABSTRACT

Data is written to data sectors of a heat-assisted magnetic recording (HAMR) medium using a laser of a HAMR head supplied with a sum of an operational current and a threshold current. A service current is supplied to the laser when the head is over servo sectors of the medium, such that a temperature of the medium at the servo sectors is greater than or equal to a temperature of the head when over the servo sectors.

20 Claims, 10 Drawing Sheets

(56) References Cited

U.S. PATENT DOCUMENTS

| 2015/0085632 A1 | 3/2015 | Kiely et al. | |
|---|---|---|---|
| 2016/0232930 A1* | 8/2016 | Lou | G11B 5/607 |
| | | | 369/13.26 |
| 2017/0092318 A1* | 3/2017 | Chu | G11B 7/1267 |
| | | | 369/13.26 |

* cited by examiner

HEAT-ASSISTED MAGNETIC RECORDING DEVICE CAPABLE OF PREVENTING CONTAMINANT ON THE HEAD

RELATED PATENT DOCUMENTS

This application claims the benefit of Provisional Patent Application No. 62/417,050 filed on Nov. 3, 2016, which is incorporated herein by reference in its entirety.

SUMMARY

Embodiments are directed to a method, comprising writing data to data sectors of a heat-assisted magnetic recording (HAMR) medium using a laser of a HAMR head supplied with a sum of an operational current and a threshold current. The method comprises supplying a service current to the laser when the head is over servo sectors of the medium, such that a temperature of the medium at the servo sectors is greater than or equal to a temperature of the head when over the servo sectors.

Embodiments are directed to an apparatus, comprising a controller coupled to circuitry configured to provide power to a laser of a write head that heats a heat-assisted recording (HAMR) medium during recording. The controller is configured to write data to data sectors of the HAMR medium using a laser of a HAMR head supplied with a sum of an operational current and a threshold current. The controller is configured to supply a service current to the laser when the head is over servo sectors of the medium, such that a temperature of the medium at the servo sectors is greater than or equal to a temperature of the head when over the servo sectors.

Embodiments are directed to a method comprising writing data to data sectors of a heat-assisted magnetic recording (HAMR) medium using a laser of a HAMR head supplied with a sum of an operational current and a threshold current. The method comprises setting a laser current to a service current at predetermined time intervals when the laser is not writing to the medium. The service current is less than a current that would cause erasure of data on the medium and above the threshold current such that a temperature of the medium at the servo sectors is greater than or equal to a temperature of the head when over the servo sectors.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification, reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device creates a localized region of high power density in the media through an electromagnetic interaction. This results in a high temperature rise in a small region on the media, with the region exceeding the Curie temperature having dimensions less than 100 nm.

Figure 1A:
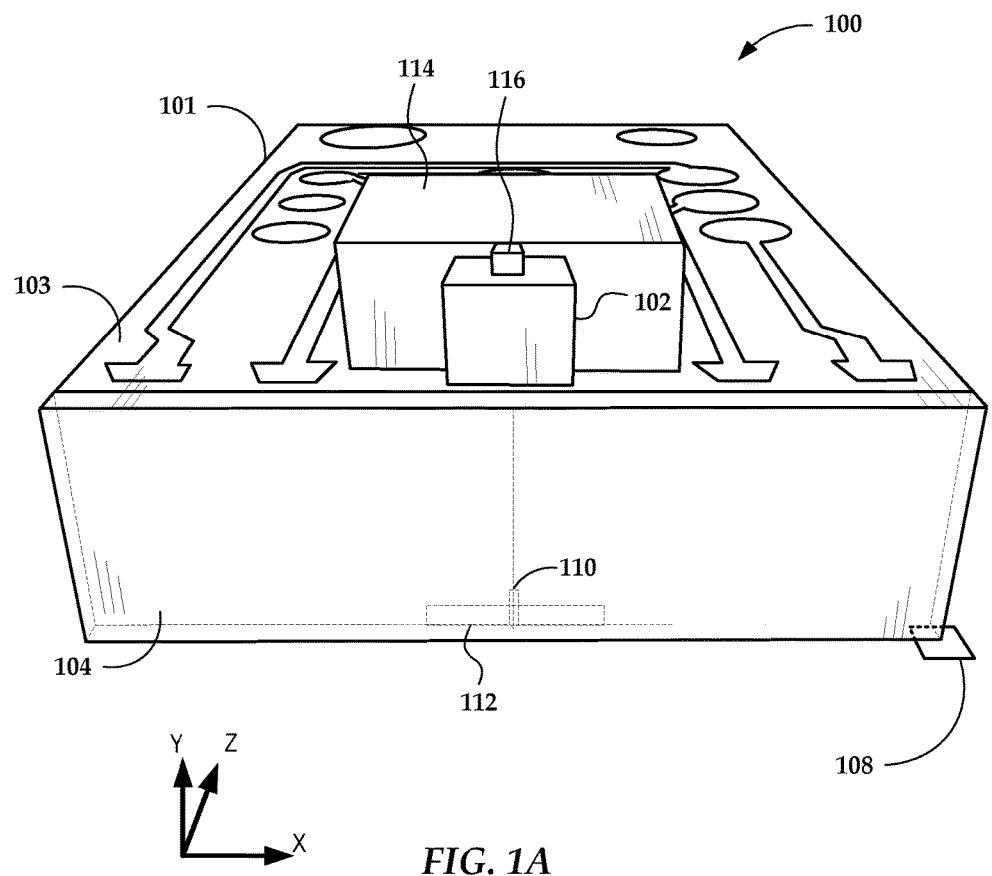
FIGS. 1A and 1B are views of a heat-assisted magnetic recording slider assembly according to example embodiments.

In reference to FIG. 1A, a perspective view shows a HAMR read/write head 100 according to an example embodiment. The read/write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 is held proximate to the moving media surface while reading and writing data. The media-facing surface 108 may be configured as an air-bearing surface that maintains separation from the media surface via a thin layer of gas, typically air or helium.

The laser diode 102 delivers light to a region within a HAMR read/write head (not shown), which is located near the media-facing surface 108. The energy is used to heat the recording media as it passes by the read/write head. Optical coupling components, such as a waveguide 110, are formed integrally within the slider body 101 (near a trailing edge surface 104, in this example) and function as an optical path that delivers energy from the laser diode 102 to the recording media via a near-field transducer 112. The near-field transducer 112 is located within the read/write head and concentrates the optical energy to a sub-wavelength spot on the recording head, causing local heating of the media during recording operations.

The laser diode 102 in this example is shown as coupled to the slider body 101 via a submount 114. The submount 114 can be used to orient and affix an edge-emitting laser so that its output is directly downwards (negative y-direction in the figure). An input surface of the slider body 101 may include a grating or other coupling features to receive light from the laser via the optic fiber and/or waveguide. The read/write head 100 also includes an optical energy measurement sensor, such as photodetector 116 (e.g., a photodiode or bolometer). The photodetector 116 is configured to measure of intensity the laser light output.

Figure 1B:
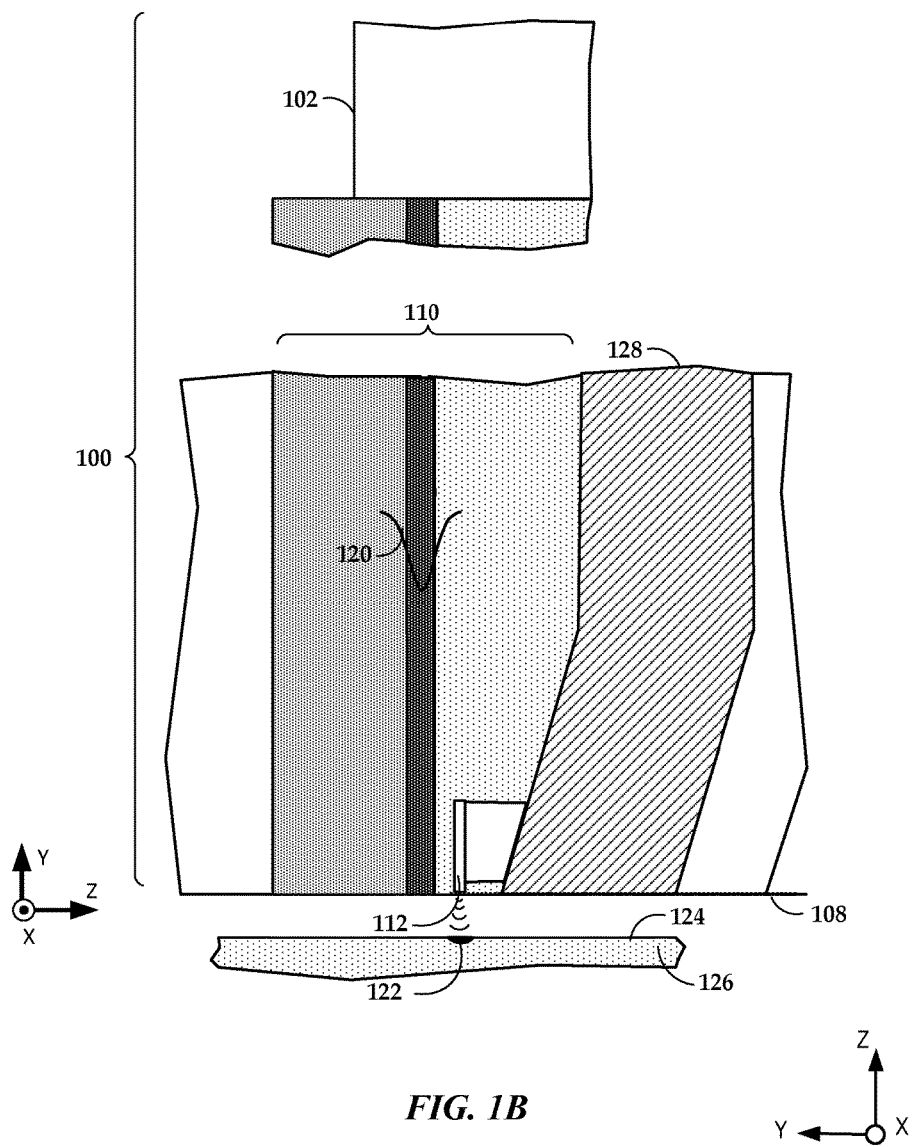

FIG. 1B shows a cross-sectional view of additional components of the read/write head proximate the media-facing surface 108. The waveguide 110 receives electromagnetic energy 120 from the laser diode 102, and couples the energy 120 to the near-field transducer 112. The near-field transducer 112 is made of a metal (e.g., gold, silver, copper, alloys thereof, etc.) that achieves surface plasmonic resonance in response to the applied energy 120. The near-field transducer 112 shapes and transmits the energy 120 to create a small hotspot 122 on a surface 124 of recording medium 126. A magnetic write pole 128 is magnetically coupled to an electrical coil (not shown). Energizing the coil causes changes in magnetic flux through the write pole 128, which changes a magnetic orientation of the hotspot 204 as it moves past the write pole 128 in the downtrack direction (z-direction). A reader stack (not shown) may also be located near the media-facing surface 108, typically in a down track direction relative to the write pole 128.

In the HAMR implementations described below, the laser diode may operate in at several general modes of operation. The first mode is idle, when the laser is fully off or inactive (e.g., no applied current or a current insufficient to induce lasing). In some cases, this mode may be used whenever the device is not writing data. When writing data, the laser is in a second, active mode, where the laser is fully active with an applied current sufficient to record or erase data to the medium. This current may be represented by the sum of an operational current ($I_{op}$) and a threshold current ($I_{th}$). $I_{th}$ represents the current for the laser to start lasing, but is insufficient, by itself, to write and/or erase data on the media. Between writing individual data sectors, such as during seeks or other non-writing events (e.g., while the head is traversing servo regions), the laser diode may be placed into a third mode. For example, the laser may be placed in a mode having a current insufficient to record or erase data to the medium such as $I_{th}$.

In HAMR drives, lube and/or other deposition may be found on at least a portion of the media. The lube and/or other deposition may also be referred to as contaminants herein. The location of where potential contaminants may be found on the media may be due to temperature differences at different times during the writing process. For example, contaminants may build up on the head over time and may be transferred to the media due to condensation and/or other processes. When a contaminant is present in servo regions of the media, this may interfere with accurate positioning of the head.

Figure 2:
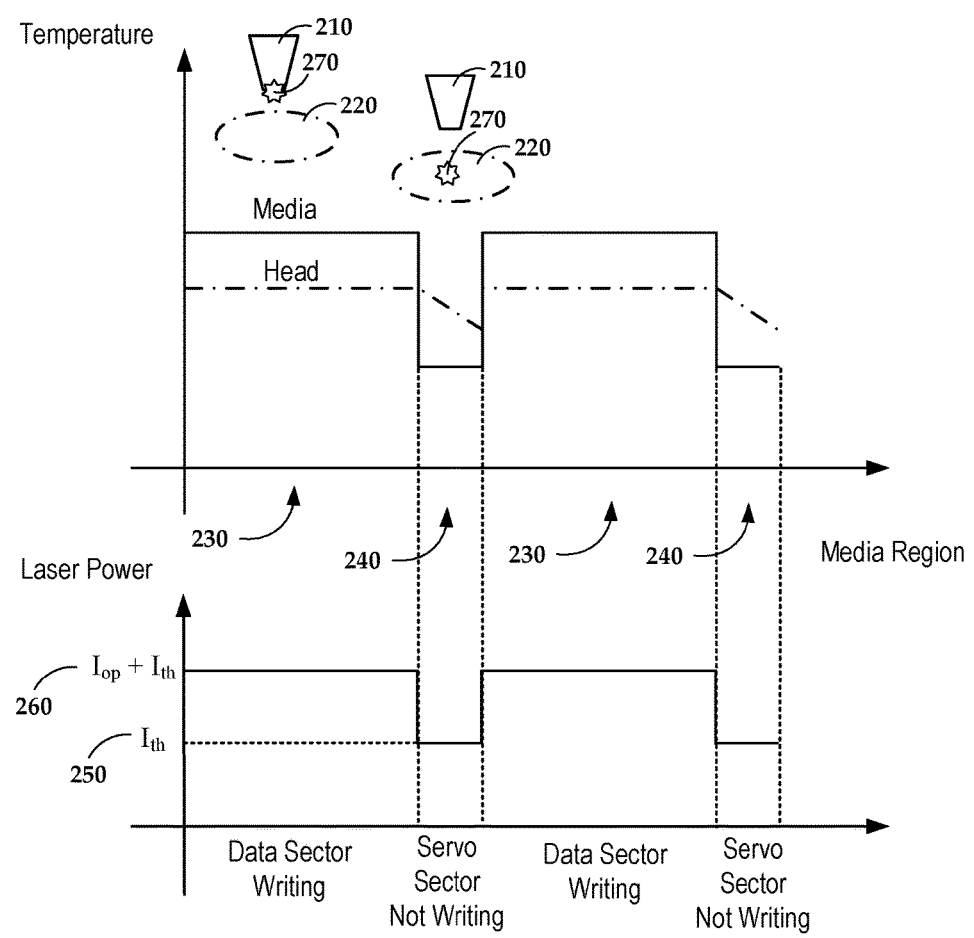
FIG. 2 illustrates head and media temperatures and laser power at different parts of the media in accordance with various embodiments described herein.

FIG. 2 illustrates head and media temperatures and laser power at different parts of the media. During the data writing process and during a time when the head is writing data, the media is heated up to a level that allows writing to the media. This is done by setting a laser current at a value that allows writing to the media. For example, the laser current value may be set to a value that is the sum of $I_{op}$ and $I_{th}$. During the data writing intervals 230, the media 220 is at a temperature that is greater than or equal to the temperature of the head 210. Because the media 220 is at a higher temperature than the head 210, any potential contaminants 270 remain on the head 210 and do not condense on the media 220. After writing the data sector, the head 210 may traverse a servo sector as shown as the servo sector 240 of FIG. 2. At this point, the head 210 is not writing to the media 220 and the laser current drops to a lower level than when writing to the media 220. For example, the laser current may be set to $I_{th}$ while over the servo sectors 240. This allows the laser to remain on so that when the head is writing again it does not need to go through the potentially lengthy process of activating the laser. When the current is set to $I_{th}$ over the servo sectors, the temperature of both the head 210 and the media 220 drops. The head 210 and the media 220 cool at different rates as shown in region 240, where the media 220 temperature drops very quickly and the head 210 temperature slowly drops compared to the rate of temperature change of the media 220. This difference in rate of cooling may cause potential contaminants 270 that are on the head 210 during the data writing process to condense and/or otherwise drop off of the head 210 and onto the media 220 while the head 210 is over the servo sector regions 240.

Figure 3A:
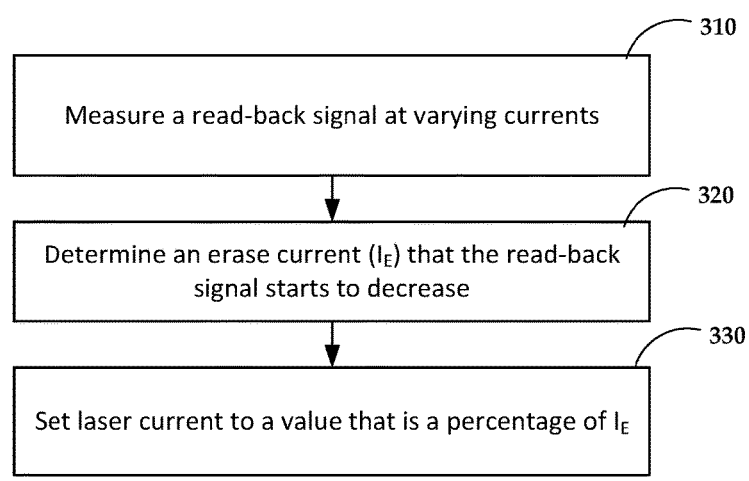
FIG. 3A shows a flow diagram for determining a laser power that prevents potential contaminants from condensing onto the media according to some aspects.

FIG. 3A shows a flow diagram for determining a laser power that prevents potential contaminants from condensing onto the media. A laser sweep is conducted by measuring 310 read-back signal for a pre-recorded track at varying currents. This procedure may be repeated multiple times in order to get an accurate value. For example, a track may be written and a read-back signal measured for a particular laser current 128 times or one million times in some cases. The number of times that the read-back signal is measured at each laser current value may the same or different for different laser current values. In some cases, the laser sweep is run with the writing field equal to zero. When the writing field is equal to zero, no current is delivered to the writer. Current may still be delivered to the head for other purposes such as for controlling protrusion, for example.

Figure 3B:
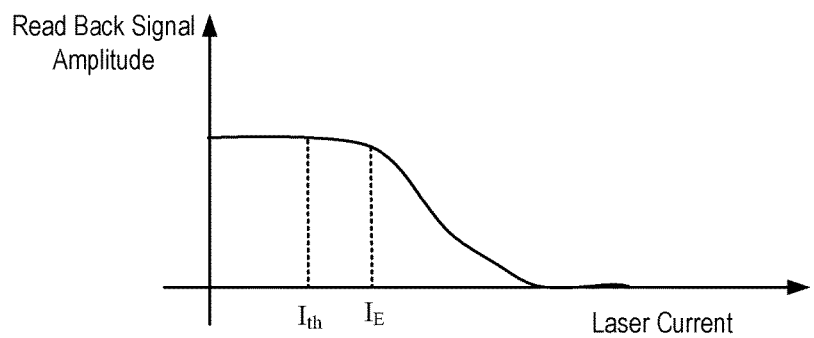
FIG. 3B illustrates how to determine the value of an erase current, $I_E$, according to some implementations.
Figure 3C:
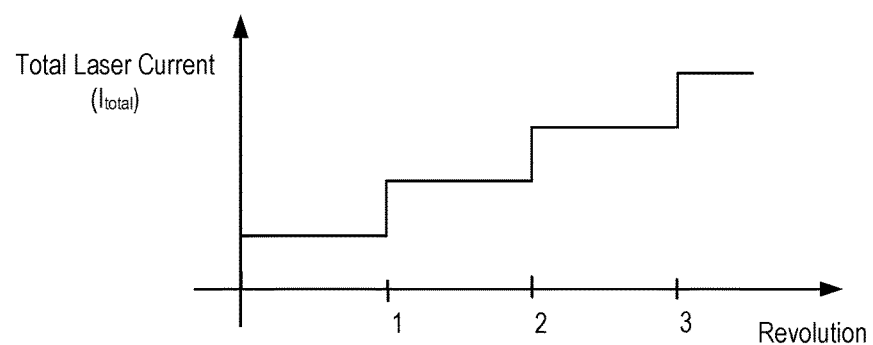
FIG. 3C shows a revolution-based laser sweep in accordance with some embodiments.
Figure 3D:
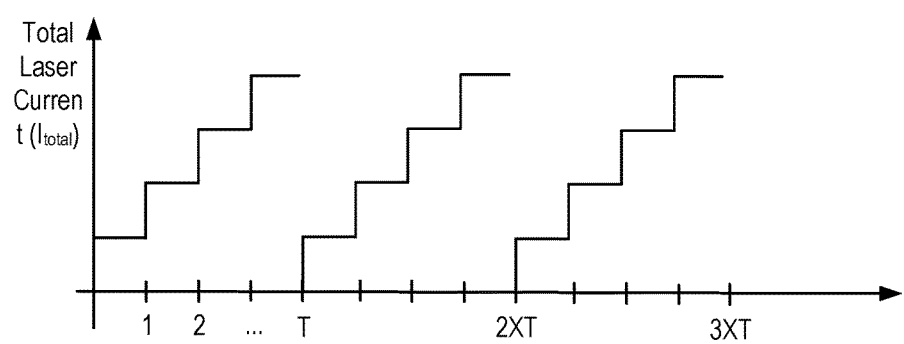
FIG. 3D illustrates a sector-based laser sweep according to some aspects.

The laser sweep can be done in various ways. In some cases, the laser sweep is conducted in a revolution and/or track-based pattern. In this case, a first laser current is used for a first revolution, a second laser current is used for a second revolution and so on. The revolution-based laser-sweep is further illustrated in FIG. 3C where the laser current is increased by a set value each revolution. In some cases, the amount of laser current increase is not the same for each revolution. According to various embodiments, the laser sweep is conducted by using a sector-based pattern. Using the sector-based pattern, the laser current may be changed multiple times within a track. This type of track sweep is shown in FIG. 3D having a period T, where T is an integer and is greater than or equal to one. In FIG. 3D, the laser current is increased by an amount each sector or every predetermined number of sectors. This may result in the laser current changing multiple times each revolution. In some cases, a combination of the revolution-based laser sweep and the sector-based laser sweep is used.

An erase current ($I_E$) is determined by determining the laser current value that the onset of data erasure occurs. $I_E$ can be determined by monitoring recording metrics. For example, FIG. 3B shows an example in which $I_E$ is determined 320 by determining the laser current that the read back signal starts to decrease. While FIGS. 3A and 3B illustrate examples in which the read-back amplitude is monitored, it is to be understood that other metrics may be monitored to determine $I_E$. For example, bit error rate, track width, track width, and/or overwrite may be monitored alone or in any combination to determine $I_E$. The process for determining $I_E$ may be done by using the revolution-based sweep pattern, the sector-based sweep pattern, and/or any combination of the disclosed sweep patterns.

The laser current is set 330 to a service current ($I_s$) value that is a percentage of $I_E$ and/or $I_{op}$ where $I_E$ is about 60% of $I_{op}$. According to various embodiments, the value of $I_s$ is less than $I_E$ such that $I_s$ does not cause erasure of data while moving over the media, but causes the media to be warm enough so that the temperature of the media is greater than or equal to the temperature of the head. For example, $I_s$ may be set to a value that is about 30% to 60% of $I_{op}$. In some cases, $I_s$ is set to a value that is in the range of about 50% to 60% of $I_{op}$. While $I_s$ may be 60% of $I_{op}$, it is to be understood that $I_s$ is less than $I_E$ for a particular system so as not to cause erasure of data on the media. $I_s$ may be set to a value that is about 50% to 95% of $I_E$, for example. In some cases, $I_s$ is set to be about 60% of $I_E$.

The percentage of $I_E$ that is used to calculate Is may be based on differences in the type of drive that is being used. For example, a drive intended for a laptop computer may use a different percentage for calculating $I_s$ than a drive intended for a server system. Various other factors may impact the percentage value used to calculate $I_s$. For example, media radius, lube type, media type, ambient temperature and/or humidity all contribute to the $I_s$ value. Thus, a final percentage value used to calculate $I_s$ may be chosen based on testing to account for the various factors that impact the $I_s$ value for a particular system. For example, an initial percentage may be chosen and then adjusted based on reliability testing. The reliability testing may be done to determine if data present on the media is disturbed by the $I_s$ value determined using the initial percentage value. If the data on the media is disturbed at the initial percentage value, the percentage value of $I_E$ may be decreased and re-tested at the reduced percentage. The reliability testing may be repeated until a percentage of $I_E$ is tested at which data present on the media is not disturbed. Determining a percentage value of $I_E$ for calculating $I_s$ may include determining whether the media is at a higher temperature than the head at the specified $I_s$ value. Determining whether the media is at a higher temperature than the head may involve determining whether contaminants are located on the head. If it is determined that contaminants are present on the head, it is likely that the temperature of the media is greater than the temperature of the head.

Figure 4:
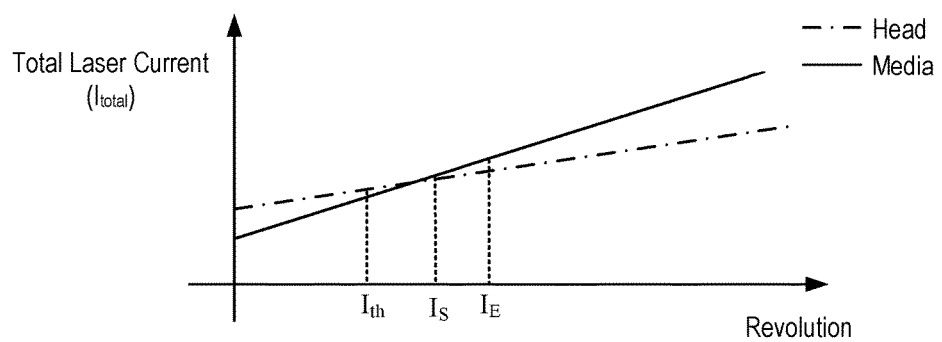
FIG. 4 illustrates the relationship of the different laser currents to each other and the media and head temperature in accordance with some implementations.

FIG. 4 illustrates the relationship of the different laser currents to each other and the media and head temperature. According to FIG. 4, $I_E$ is higher than $I_s$, and at $I_s$ the temperature of the media is greater than the temperature of the head, thereby preventing potential contaminants from condensing onto the media. In the case where the laser current is set to the threshold current ($I_{th}$), the media temperature is less than the head temperature, thus raising the chances that contaminants will condense onto the media.

Figure 5:
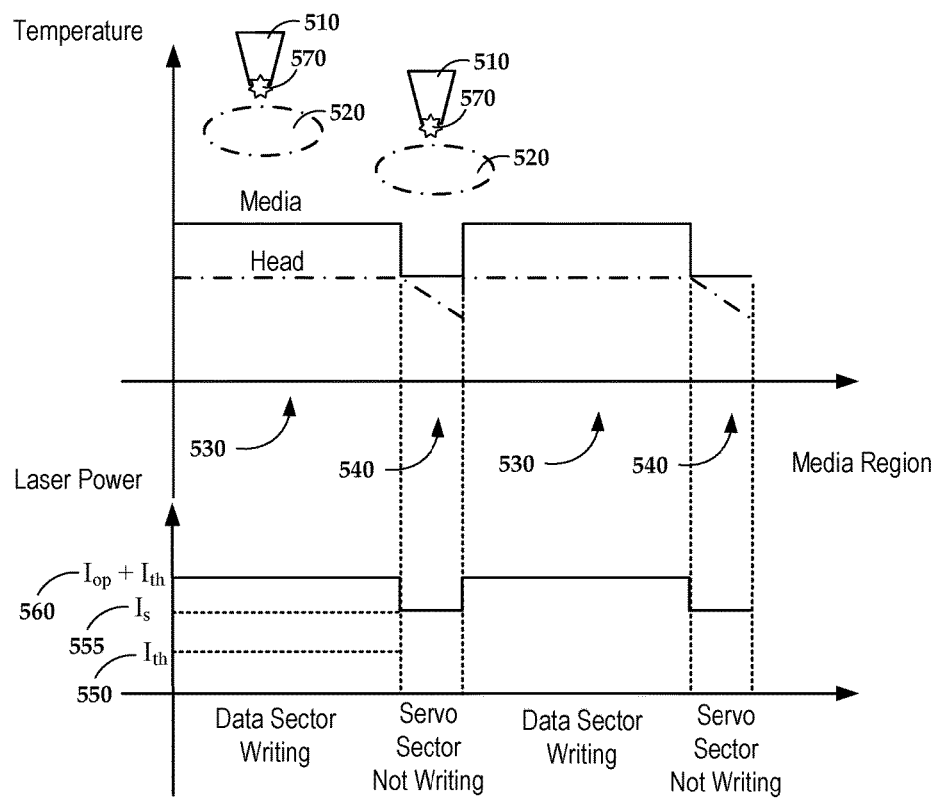
FIG. 5 illustrates head and media temperatures and laser power at different parts of the media in accordance with various embodiments described herein.

FIG. 5 illustrates head and media temperatures and laser power at different parts of the media in accordance with various embodiments described herein. During the data writing intervals 530, the laser current is set to a value ($I_{op}+I_{th}$) that causes the media 520 to be at a higher temperature than the temperature of the head 510. Because the media 520 is at a higher temperature than the head 510, any potential contaminants 570 remain on the head 510 and do not condense on the media 520. After writing the data sector, the head 510 may traverse a servo sector, as shown as the servo sectors 540 of FIG. 5. At this point, the head 510 is not writing to the media 520 and the laser current drops to a lower level than when writing to the media 520. For example, the laser current may be set to $I_s$ while over the servo sectors 540. When the current is set to $I_s$ over the servo sectors 540, the temperature of both the head 510 and the media 520 drops. Setting the laser current to $I_s$ instead of $I_{th}$ as in the previous example of FIG. 2 allows the temperature of the head 510 to remain below or equal to the temperature of the media 520 while over the servo sector regions 540. Setting the laser current to a value causes the temperature of the media 520 to be greater than or equal to the temperature of the head 510 prevents potential contaminants 570 from condensing onto the media 520 while the head 510 is over the servo regions 540. While FIG. 5 shows a sudden laser current change from $I_{op}+I_{th}$ to $I_s$ when transitioning between writing data to a data sector and traversing a servo sector, it is to be understood that the laser current may be gradually decreased to $I_s$ from $I_{op}+I_{th}$. Similarly, the laser current may be gradually increased when entering a writing mode.

While the above methods may prevent contaminants from condensing on the media, the contaminants are still located on the head. FIGS. 6A, 6B, 7A, and 7B describe ways to remove contaminants from the head. According to FIG. 6A, the head is periodically moved 680 to a predetermined location in a data region of the media. For example, the head may be moved to the predetermined location every 1 write hour. In some cases, the system is configured to remove contaminants from the head at any time that the head is over a data region and is not preforming a write operation. For example, the system may be configured to remove contaminants during non-write events such as track seeks. In some cases, the head is moved to the same predetermined location every time that the system undergoes the contaminant removal process. In some cases, there are multiple locations. The location may also be a random location that is not a servo sector. During the time in which the head is at the predetermined location above a data region, the laser current is set 685 to a value that causes the head to be at a higher temperature than the media. For example, the laser current may be set to a value that is less than $I_E$ and $I_S$, such as $I_{th}$. The laser current is set 690 to a value that causes the head to be at a lower temperature than the media while over servo regions. This may prevent the any potential contaminants from condensing onto the media while the head is over the servo sectors.

Figure 6A:
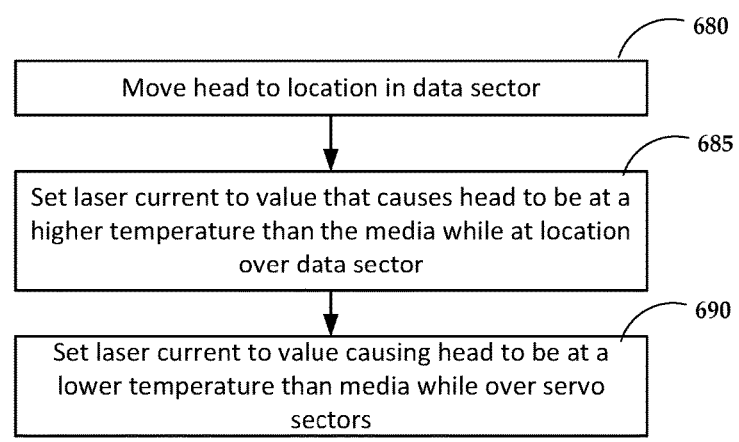
FIG. 6A shows a method for removing contaminants from the head of a recording device according to some implementations.
Figure 6B:
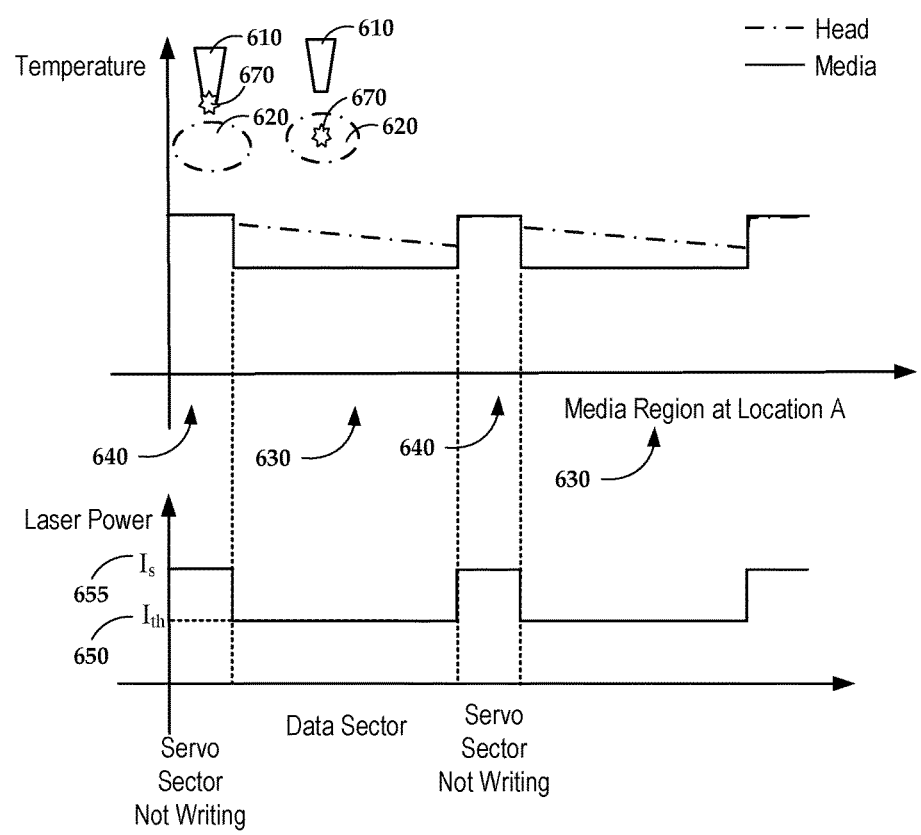
FIG. 6B illustrates the temperature of the head and the media at different points in the process of removing the contaminants from the head as described in FIG. 6A in accordance with various embodiments described herein.

FIG. 6B illustrates the temperature of the head and the media at different points in the process of removing the contaminants from the head as described in FIG. 6A. While over servo sector regions 640, the laser current is set to a current that causes the temperature of the head 610 to be less than or equal to the temperature of the media 620. This prevents any potential contaminants 670 on the head 610 from condensing onto the media 620 while over the servo sectors 640. When the head 610 is over data sectors 630 and not writing, the laser current is set to a value (e.g., $I_{th}$) that causes the head 610 to have a temperature than is greater than the temperature of the media 620. As described previously, the head 610 is at a greater temperature during these times because the head 610 cools off at a slower rate than the media 620. Because the media 620 has a lower temperature than that of the head 610 while over the data regions 630, potential contaminants 670 on the head 610 condense on the media 620.

Figure 7A:
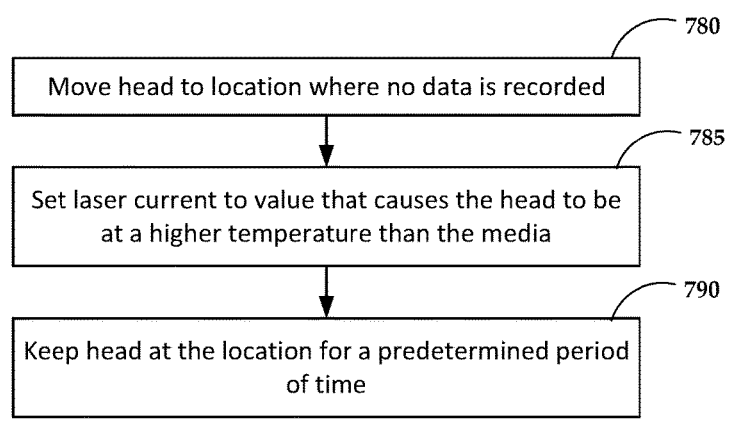
FIG. 7A shows another method for removing contaminants from the head of a recording device according to some aspects.
Figure 7B:
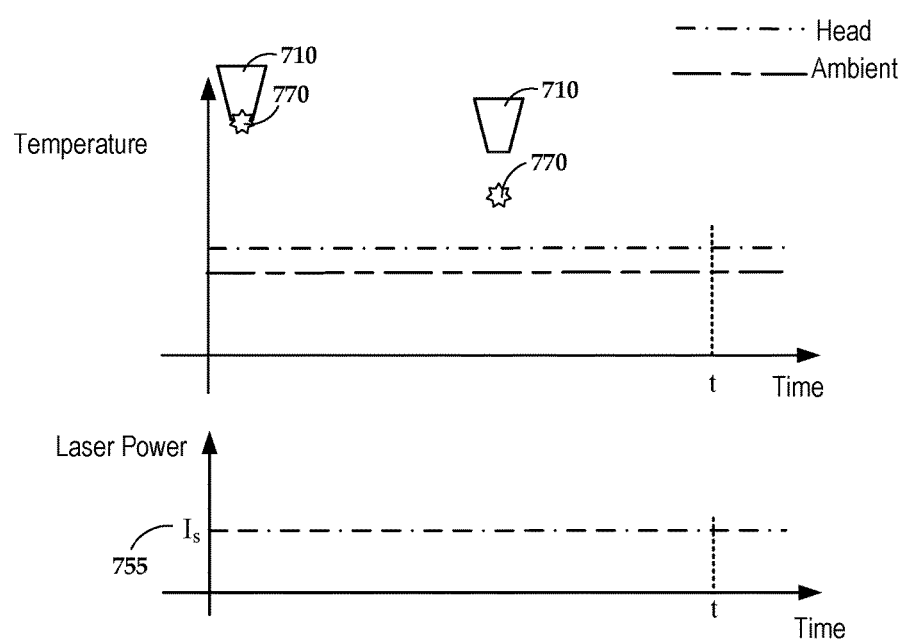
FIG. 7B illustrates the temperature of the head and the media at different points in the process of removing the contaminants from the head as described in FIG. 7A in accordance with various embodiments described herein.

FIGS. 7A and 7B show a methods for removing contaminants from the head of a recording device in accordance with various embodiments. In FIG. 7A, the head is moved 780 to a location at which data is not recorded. For, example, this could be done on the load/unload ramp and/or using a mechanical stop. In some cases, the head is moved to a location that does not have servo positioning to deposit potential contaminants. In this case, once the contaminant is off of the head or after a predetermined period of time, the head moves in a predetermined and/or random direction until it reaches a servo region and then resumes normal operation. While the head is at the location which no data is recorded, the laser current is set 785 to a value that causes the head to be at a higher temperature than an ambient temperature. For example, the laser current may be set to $I_s$, causing the temperature of the head to be higher than the ambient temperature. The head may be kept 790 at the location for a predetermined period of time. The predetermined period of time may be enough time for the contaminant to be removed from the head and/or condense off of the head.

FIG. 7B illustrates the temperature of the head and the media at different points in the process of removing the contaminants from the head as described in FIG. 7A. While at the location at which no data is recorded, the laser current is set to a value, e.g., $I_s$, that causes the temperature of the head 710 to be less than or equal to the ambient temperature. After a predetermined period of time, any potential contaminants 770 condense off of the head due to the higher head temperature relative to the ambient temperature. While FIGS. 6A-7B describe ways of removing contaminants from the head without contacting the media, it is to be understood that the contaminants may be removed by contacting the media at specific intervals and/or at specific areas on the media. The processes carried out in FIGS. 6A, 6B, 7A, and/or 7B may be carried out at specified time intervals. In some cases, at least one of the processes in FIGS. 6A-7B are carried out in response to a predetermined number of sectors being written and/or a predetermined number of write commands being completed, for example.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method, comprising:
    writing data to data sectors of a heat-assisted magnetic recording (HAMR) medium using a laser of a HAMR head supplied with a sum of an operational current and a threshold current; and
    when the head is over servo sectors of the medium, supplying a service current to the laser such that a temperature of the medium at the servo sectors is greater than a temperature of the head when over the servo sectors.

2. The method of claim 1, wherein the service current is between the operational current and the threshold current of the laser.

3. The method of claim 1, wherein a contaminant on the head is prevented from condensing on the servo sectors of the medium in response to the temperature of the medium at the servo sectors being greater than or equal to the temperature of the head.

4. The method of claim 1, further comprising,
    determining an erase current by determining laser current value at which a read-back signal begins to decrease; and
    determining the service current based on the erase current.

5. The method of claim 4, wherein the service current is about 60% of the erase current.

6. The method of claim 4, wherein the service current is about 50% of the erase current.

7. The method of claim 4, further comprising determining the erase current by conducting a revolution-based current sweep.

8. The method of claim 4, further comprising determining the erase current by conducting a sector-based current sweep.

9. The method of claim 1, further comprising, while not writing to the media, supplying the service current to the laser while the head is over the servo sectors and supplying the threshold current to the laser while over data sectors, the threshold current being less than the service current.

10. The method of claim 1 further comprising:
while in a non-writing mode and while over data sectors of the media, setting the laser current to a value that causes the temperature of the medium to be less than the temperature of the head; and
while over the servo sectors, setting the laser current to a value that causes the temperature of the medium to be greater than or equal to the temperature of the head.

11. The method of claim 1, further comprising:
moving the head to a location at which no data is recorded;
setting a current supplied to the laser to a value that causes the head to be at a higher temperature than the media; and
keeping the head at the location for a predetermined period of time.

12. An apparatus, comprising:
a controller coupled to circuitry configured to provide power to a laser of a write head that heats a heat-assisted recording (HAMR) medium during recording, the controller configured to:
write data to data sectors of the HAMR medium using a laser of a HAMR head supplied with a sum of an operational current and a threshold current; and
when the head is over servo sectors of the medium, supply a service current to the laser such that a temperature of the medium at the servo sectors is greater than a temperature of the head when over the servo sectors.

13. The apparatus of claim 12, wherein the service current is between the operational current and the threshold current of the laser.

14. The apparatus of claim 12, wherein a contaminant on the head is prevented from condensing on the servo sectors of the medium in response to the temperature of the medium at the servo sectors being greater than or equal to the temperature of the head.

15. The apparatus of claim 12, wherein the controller is further configured to:
determine an erase current by determining a laser current value at which a read-back signal begins to decrease; and
determine the service current based on the erase current.

16. The apparatus of claim 15, wherein the service current is about 50% of the erase current.

17. The apparatus of claim 15, wherein the service current is about 50% of the erase current.

18. A method, comprising:
writing data to data sectors of a heat-assisted magnetic recording (HAMR) medium using a laser of a HAMR head supplied with a sum of an operational current and a threshold current; and
at predetermined time intervals when the laser is not writing to the medium, setting a laser current to a service current, the service current being less than a current that would cause erasure of data on the medium and above the threshold current such that a temperature of the medium at the servo sectors is greater than a temperature of the head when over the servo sectors.

19. The method of claim 18, wherein a contaminant on the head is prevented from condensing on the servo sectors of the medium in response to the temperature of the medium at the servo sectors being greater than or equal to the temperature of the head.

20. The method of claim 18, further comprising,
determining an erase current by determining a point at which a read-back signal begins to decrease; and
determining the service current based on the erase current.

* * * * *